US012118444B2

(12) United States Patent
Sanchez et al.

(10) Patent No.: US 12,118,444 B2
(45) **Date of Patent: *Oct. 15, 2024**

(54) COGNITIVE SENSOR FUSION MANAGEMENT

(71) Applicant: Cisco Technology, Inc., San Jose, CA (US)

(72) Inventors: Marcelo Yannuzzi Sanchez, Canton de Fribourg (CH); Carlos M. Pignataro, Cary, NC (US); Simon Dyke, Lyndhurst (GB); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,849

(22) Filed: Aug. 22, 2023

(65) Prior Publication Data

US 2023/0394370 A1 Dec. 7, 2023

Related U.S. Application Data

(63) Continuation of application No. 16/743,716, filed on Jan. 15, 2020, now Pat. No. 11,763,194.

(Continued)

(51) Int. Cl.
*G06N 20/00* (2019.01)
*H04Q 9/00* (2006.01)

(52) U.S. Cl.
CPC ............... *G06N 20/00* (2019.01); *H04Q 9/00* (2013.01); *H04Q 2209/10* (2013.01)

(58) Field of Classification Search
CPC ........... H04Q 2209/00; H04Q 2209/10; H04Q 2209/30; H04Q 2209/40; H04Q 2209/70; H04Q 9/00; G06N 20/00
See application file for complete search history.

(56) References Cited

U.S. PATENT DOCUMENTS

| | | | | |
|---|---|---|---|---|
| 7,788,109 B2 * | 8/2010 | Jakobson | ............ | H04L 41/0631 705/1.1 |
| 8,204,927 B1 | 6/2012 | Duong et al. | | |

(Continued)

OTHER PUBLICATIONS

Chandrasekaran B., "A Selective Sensor Framework Using Sensor Fusion And Sensor Maps To Achieve Complete Coverage Planning of a Semiautonomous Robotic Vehicle," webpages.uncc.edu, 2017, pp. 1-148.

(Continued)

*Primary Examiner* — Franklin D Balseca
(74) *Attorney, Agent, or Firm* — Polsinelli P.C.

(57) ABSTRACT

Systems, methods, and computer-readable for cognitive sensor fusion management include obtaining one or more data streams from one or more sensors. Learning algorithms are used for determining whether a combination of the one or more data streams includes sufficient information for achieving a desired outcome, based on context, business verticals, or other considerations. One or more modifications are determined to at least the one or more data streams or one or more sensors based on whether the combination of the one or more data streams includes sufficient information for achieving the desired outcome. In a closed-loop system, feedback from implementing the one or more modifications can be used to update the desired outcome.

20 Claims, 7 Drawing Sheets

Related U.S. Application Data

(60) Provisional application No. 62/847,233, filed on May 13, 2019.

(56) References Cited

U.S. PATENT DOCUMENTS

| | | | | |
|---|---|---|---|---|
| 9,449,084 | B2 * | 9/2016 | Chong | H04H 60/49 |
| 9,451,414 | B1 | 9/2016 | Birkenes et al. | |
| 9,749,528 | B1 | 8/2017 | Fink et al. | |
| 10,623,834 | B1 | 4/2020 | Matheson et al. | |
| 11,523,299 | B2 | 12/2022 | Suganuma et al. | |
| 11,763,194 | B2 * | 9/2023 | Sanchez | H04Q 9/00<br>706/12 |
| 2019/0121350 | A1 | 4/2019 | Cella et al. | |

OTHER PUBLICATIONS

Jakobson G., et al., "An Approach To Integrated Cognitive Fusion," Semantic scholar, Sep. 30, 2019, pp. 1-8.

Lang et al., "The Intelligent Container: A Cognitive Sensor Network For Transport Management," IEEE Sensors Journal, vol. 11, No. 3, Mar. 2011, pp. 688-698.

* cited by examiner

COGNITIVE SENSOR FUSION MANAGEMENT

CROSS-REFERENCES TO RELATED APPLICATIONS

This application is a Continuation of U.S. Non-Provisional patent application Ser. No. 16/743,716, filed Jan. 15, 2020, which in turn claims the benefit of U.S. Provisional Application No. 62/847,233, filed May 13, 2019, which is hereby incorporated by reference, in its entirety and for all purposes.

TECHNICAL FIELD

The subject matter of this disclosure relates in general to the field of cognitive sensor fusion management. More specifically, example aspects are directed to adaptively managing sensor fusion from one or more sources based on dynamically desired outcomes.

BACKGROUND

Machine learning techniques are known for collecting and analyzing data from different devices for various purposes. For example, in the context of manufacturing, energy production, construction, transport, security, enterprises, or various other environments, data may be collected from different machines, devices, and systems. Such data can relate to different workflows, parameters, and metrics which may be used to achieve design, development, deployment, and operation of related technologies. Different types of sensors can be used for collecting and forwarding the data to one or more locations where the data may be stored and analyzed to effect desired improvements.

Considering the example of a specific environment (also referred to as a business vertical), the type of data to be collected is predefined or definable based on the desired outcome for the environment. Based on the type of data to be collected, decisions can be made regarding the specific types and deployment of sensors which can collect the desired data. The existing machine learning techniques can detect patterns in the data for potentially optimizing the collection and analysis of the data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
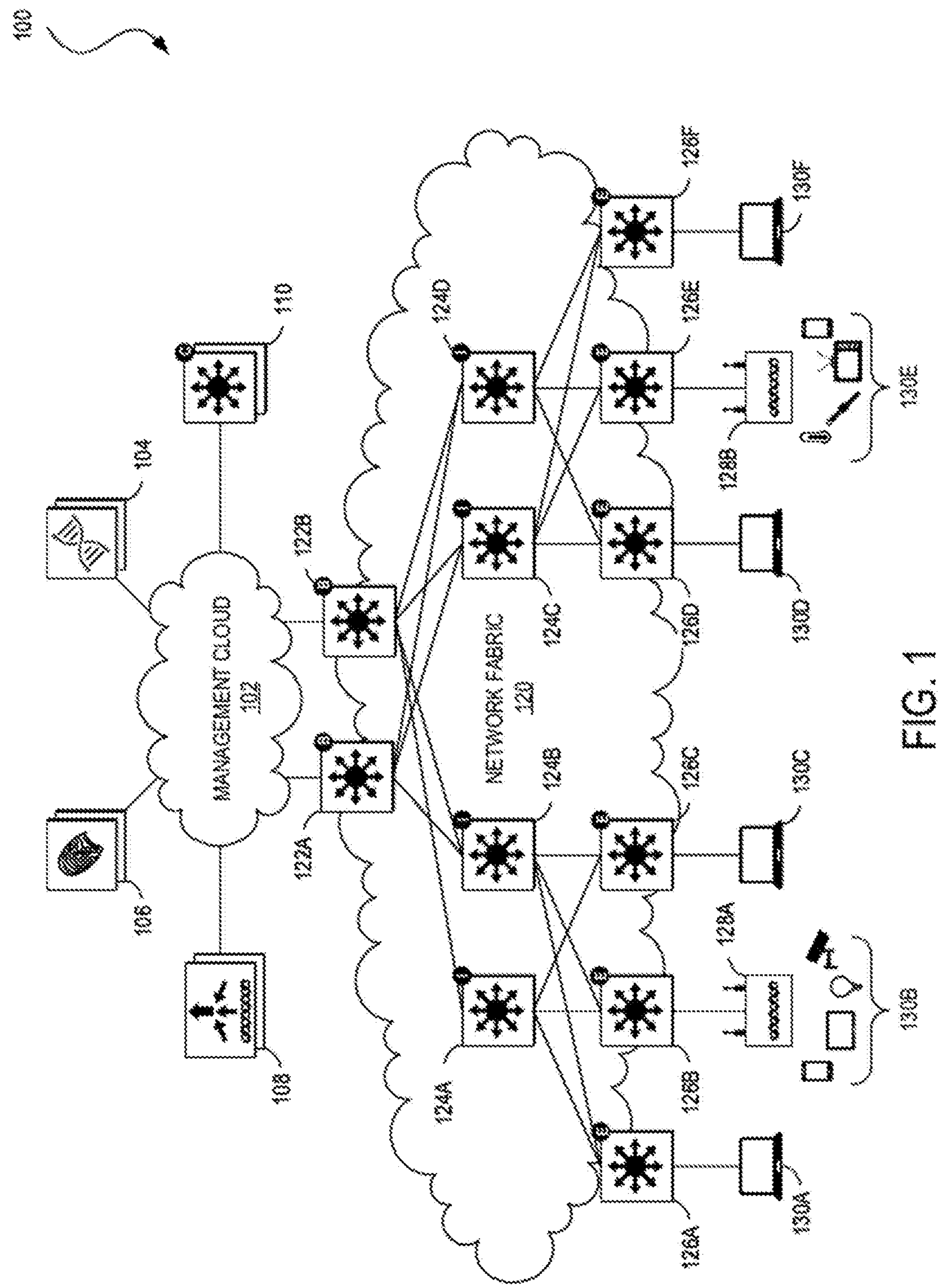
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously mentioned, existing approaches for combining sensor data include machine learning techniques for collecting and analyzing predefined data types or for specific business verticals. However, there are no known approaches for vertical-agnostic sensor fusion management technique. In example aspects of this disclosure, cognitive sensor fusion management techniques are described various aspects of the data collection and analysis involved in sensor data fusion can be adaptively learned and improved upon.

For example, learning algorithms for machine learning, deep learning, artificial intelligence, or other analysis models are described for obtaining one or more data streams. The data streams can include data supplied by various numbers and types of sensors. The data streams can be obtained based on automatic techniques for discovery, onboarding, managing identities, implementing policy controls, or applying sensor fusion algorithms on sensor data obtained from a plurality of sensors. The one or more data streams can be analyzed based on specific contexts and desired outcomes related to one or more business verticals. The analysis of the data streams can be performed using the learning algorithm to determine whether the optimum amount and combination of sensor data is available for achieving a desired outcome, where the desired outcome can be dynamically updated using a closed-loop feedback system. The number and/or type of sensor data streams can be adjusted (e.g., increased, decreased, or otherwise modified) based on the learning algorithm to achieve the desired outcome. In some examples, the types of sensors and choice of sensors used (or conversely, powered down/unselected from use) can be dynamically and automatically modified based on desired outcomes and changing conditions which can be internal to the sensors, specific to the systems, and/or based on the outcomes of analyses on the fused sensor data.

Disclosed herein are systems, methods, and computer-readable media for cognitive sensor fusion management. A cognitive sensor fusion management technique includes obtaining one or more data streams from one or more sensors. Learning algorithms are used for determining whether a combination of the one or more data streams includes sufficient information for achieving a desired outcome, based on context, business verticals, or other considerations. One or more modifications are determined to at least the one or more data streams or one or more sensors based on whether the combination of the one or more sensor data streams includes sufficient information for achieving the desired outcome. In a closed-loop system, feedback from implementing the one or more modifications can be used to update the desired outcome.

In some examples, a method is provided. The method includes obtaining one or more data streams from one or more sensors in a cognitive sensor fusion management system. The method further includes determining whether a combination of the one or more data streams comprises sufficient information for achieving a desired outcome, and determining one or more modifications to at least the one or more data streams or one or more sensors based on whether the combination of the one or more data streams comprises sufficient information for achieving the desired outcome.

In some examples, a system is provided. The system, comprises one or more processors; and a non-transitory computer-readable storage medium containing instructions which, when executed on the one or more processors, cause the one or more processors to perform operations including: obtaining one or more data streams from one or more sensors in a cognitive sensor fusion management system; determining whether a combination of the one or more data streams comprises sufficient information for achieving a desired outcome; and determining one or more modifications to at least the one or more data streams or one or more sensors based on whether the combination of the one or more data streams comprises sufficient information for achieving the desired outcome.

In some examples, a non-transitory machine-readable storage medium is provided, including instructions configured to cause a data processing apparatus to perform operations including: obtaining one or more data streams from one or more sensors in a cognitive sensor fusion management system; determining whether a combination of the one or more data streams comprises sufficient information for achieving a desired outcome; and determining one or more modifications to at least the one or more data streams or one or more sensors based on whether the combination of the one or more data streams comprises sufficient information for achieving the desired outcome.

In some examples of the methods, systems, and non-transitory machine-readable storage media, the one or more modifications comprise a reduction in at least the one or more data streams or the one or more sensors.

Some examples of the methods, systems, and non-transitory machine-readable storage media further comprise implementing the reduction and determining whether a combination of one or more data streams obtained from implementing the reduction comprises sufficient information for achieving the desired outcome.

In some examples of the methods, systems, and non-transitory machine-readable storage media, the one or more modifications comprise an increase in at least the one or more data streams or the one or more sensors.

Some examples of the methods, systems, and non-transitory machine-readable storage media further comprise implementing the increase and determining whether a combination of one or more data streams obtained from implementing the increase comprises sufficient information for achieving the desired outcome.

Some examples of the methods, systems, and non-transitory machine-readable storage media further comprise updating the desired outcome based on implementing one or more of the modifications.

Some examples of the methods, systems, and non-transitory machine-readable storage media further comprise implementing the one or more modifications to improve accuracy of the desired outcome or reduce power consumption of the one or more sensors, one or more gateways, one or more access points, or other computing devices.

In some examples of the methods, systems, and non-transitory machine-readable storage media, obtaining the one or more data streams comprises one or more of automatic discovery, onboarding, managing identities, implementing policy controls, or applying sensor fusion algorithms on sensor data obtained from the one or more sensors.

In some examples of the methods, systems, and non-transitory machine-readable storage media, the desired outcome is dynamically determined by the cognitive sensor fusion management system based on one or more of a context or business vertical.

In some examples of the methods, systems, and non-transitory machine-readable storage media, the one or more sensors comprise one or more of audio, video, motion detection, radar, or thermal imaging sensors.

DESCRIPTION OF EXAMPLE EMBODIMENTS

Disclosed herein are systems, methods, and computer-readable media for schemes for cognitive sensor fusion management. In some examples, a cognitive sensor fusion management system according to aspects of this disclosure can be configured to learn and automatically identify the type of data and the related data sources for a sensor fusion management model to be implemented by the cognitive sensor fusion management system. The cognitive sensor fusion management system can automatically select and onboard the identified data sources. In some examples, the cognitive sensor fusion management system can implement learning techniques based on (a) systems for automatically discovering, onboarding, activating/deactivating source inputs from sensors, etc. and/or (b) a continuous analysis of inputs and desired outputs of the sensor fusion management process for a given sensor fusion management model.

In some examples, the selection of data sources can be based on various criteria. For instance, in some cases, the cognitive sensor fusion management system can balance between accuracy and sustained operation based on the remaining power at a battery powered sensor. The cognitive sensor fusion management system can selectively reduce the source input streams and/or devices automatically, and even trigger actions to reduce the sensor update rates, shut down or send to sleep mode those that are not strictly needed. These changes can lead to extending the battery life of devices such as the sensors as well as and the gateways that may be directly connected to and configured to aggregate traffic from one or more endpoint sensors. The sensors and/or the gateways can be battery-powered (in addition to possibly being powered by other sources such as wired electric connections, solar panels, etc.), so power conservation is an important goal for such devices.

In some examples, the sensors can be utilized to achieve an objective or desired outcome such as balancing power conservation and accuracy by analyzing data from a plurality of sensor streams and learning in a closed loop system whether the system has access to more data, less data, or the specific amount of data needed to obtain a specific task (e.g., tracking objects on a field with a predetermined level of acceptable accuracy). Over time, when a sensor picks up data that needs to be confirmed or enhanced by other sensors, the model can intelligently select the minimum number of sensors or data sources which can be used to reach the desired outcome. In some examples, one or more sensors may need to be powered on in a sequence such that if several sensors are needed to make a conclusion, then by powering up the sensors up one at a time and continuously evaluating their capability, additional sensors can be added only as needed to achieve the desired outcome. Thus, less than all available sensors can be used without compromising on the desired outcome. The following sections describe the example system and methods in more detail.

FIG. 1 illustrates an example of a physical topology of a network 100 which may be configured according to aspects of this disclosure. In one example, the network 100 may provide intent-based networking in an enterprise network. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

In this example, the network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. In some examples, the endpoints 130 can include various sensors which can be deployed in the computing devices. For example, the endpoints 130 can include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow. In some examples, a logical architecture for the network 100 can be implemented to include functions related to management, control, network fabric, physical layer, and shared services for the network 100.

Figure 2:
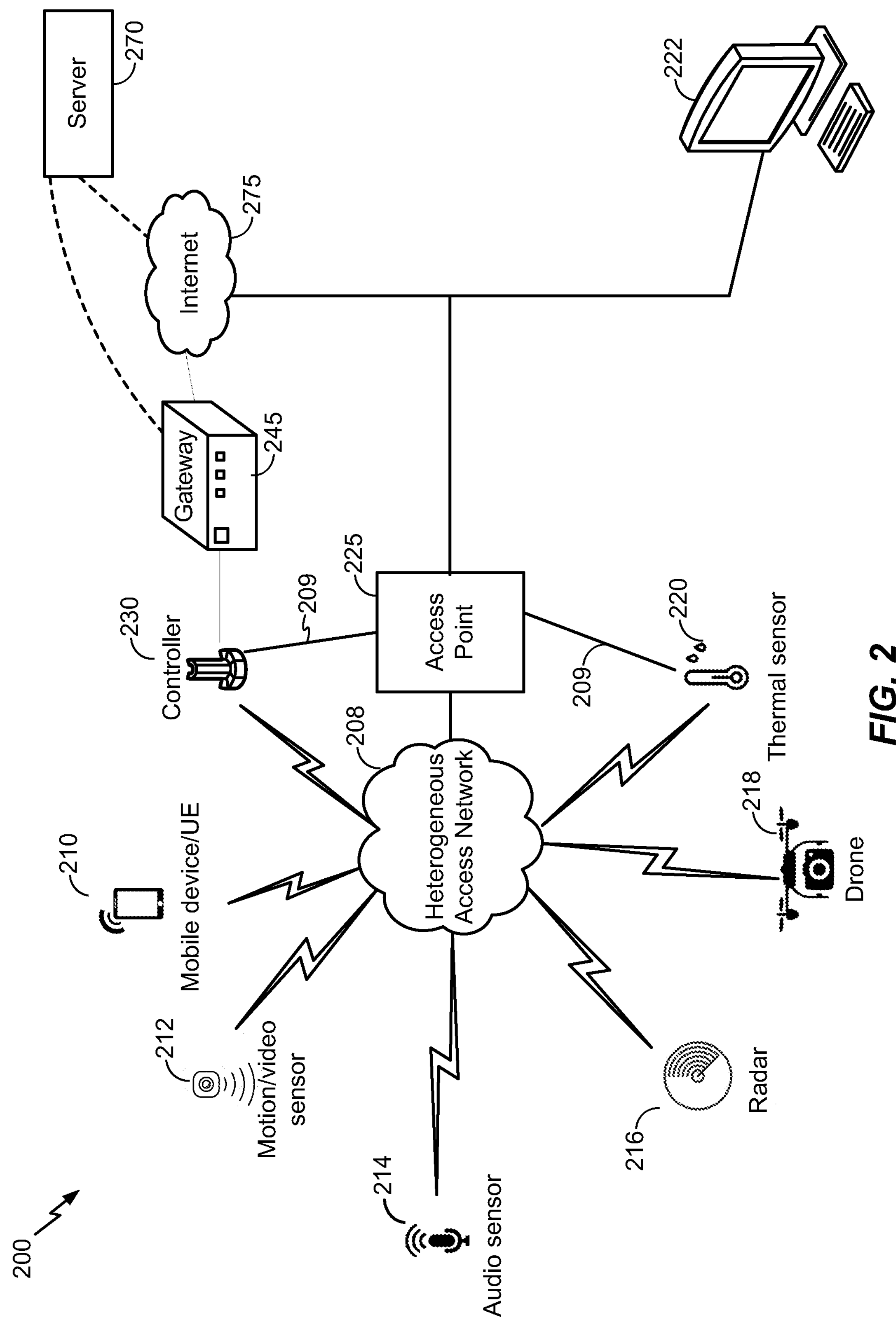
FIG. 2 illustrates a network including sensors used in a cognitive sensor fusion management system, in accordance with some examples.

FIG. 2 illustrates an example topology of a network 200 which may be configured for sensor fusion management according to aspects of this disclosure. In some aspects, the network 200 can be implemented using the network fabric, management, and/or architecture described with reference to the network 100 of FIG. 1. In some examples, the network 200 can include functionality for obtaining data streams from various endpoints which can include sensors of different types. The network 200 can include cognitive sensor fusion management techniques for fusing data from the different data streams.

In this disclosure, a running example of a monitoring system which may be deployed in a remote region such as a natural park or gaming reserve is used for explaining some aspects of the sensor fusion management techniques. For example, the network 200 can include various sensors which may be employed in the monitoring of a certain geographical region. In some examples, the geographical region can include a wildlife reserve with various species of wildlife which can roam freely across the geographical region. The geographical region can also include different types of human actors, machines, natural and man-made artifacts, natural resources, etc. A desirable objective may include conservation of the wildlife in the geographical region. For example, the human actors can include benign human actors such as rangers, staff, tourists, and others who do not pose a threat to the wildlife, as well as malicious human actors such as poachers. It may be desirable to track the various types of elements in the geographical area, identify potential threats, distinguish between different types of actors, minimize false positives and false negatives, etc. For this, different types of sensors may be used to collect data pertaining to the geographical area within the context of conserving the wildlife.

Some sensors can include endpoints of a network as discussed with reference to FIG. 1. For example, sensors can be deployed in a relatively remote or inaccessible area with limited connectivity to the Internet, cellular networks, wired electric power supply, etc. For example, some sensors can include "Internet of Things" devices (or "IoT" devices) which may be powered through alternative sources such as being battery powered or solar powered, with limited runtime. It may be desirable to conserve the power consumed by some sensors in the network 200 while being able to achieve the above-described outcomes. Further, as previously mentioned, it may be also desirable to conserve the power consumed by the gateways connected to the sensors. For example in environments such as IoT networks or others, the collection of sensor data may be implemented using gateways which may also be powered by batteries, solar panels, or other sources. Sensor fusion techniques can also be distributed in the sense that some aspects of the fusion can be performed by processes implemented by the gateways, while other aspects can be implemented using one or more other modules described herein. In some examples, the cognitive sensor fusion algorithms described herein can be configured with power conservation as one of the objectives, the power conservation objectives applicable to the sensors, the gateways, or other network devices which may be battery powered or otherwise benefit from power conservation.

As used herein, a sensor can refer to any object or device that has an addressable interface (e.g., an Internet protocol (IP) address, a Bluetooth identifier (ID), a near-field communication (NFC) ID, etc.) and can transmit information to one or more other devices over a wired or wireless connection. A sensor, for example, can have a passive communication interface, such as a quick response (QR) code, a radio-frequency identification (RFID) tag, an NFC tag, or the like, or an active communication interface, such as a modem, a transceiver, a transmitter-receiver, or the like. In some examples, sensors can have a particular set of attributes (e.g., a device state or status, such as whether the sensor is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to the network 200.

In some aspects, the network 200 can support wireless communications among a plurality of sensors and other endpoint devices. For example, a mobile phone 210, motion or video sensor 212, microphone or audio sensor 214, radar 216, drone 218, thermal imager or thermal sensor 220, etc., are shown as examples of the types of sensors or devices which may be present in the geographical area in which the network 200 is deployed. The devices 210-220 can communicate over any wired or wireless interface. In some examples, the devices 210-220 can communicate with one another or with an access point 225 (e.g., such as a WLC 108) over a heterogeneous access network 208. In various examples, the heterogeneous access network 208 can include or be compatible with a wired network with a wired connection 209 or another air interface. For example, the heterogeneous access network 208 can include a local area network (LAN), a wide area network (WAN) such as a low-power wide-area network (LPWAN) or LoRa (Long Range), etc. In some examples, the heterogeneous access network 208 can support communication standards such as Long Term Evolution (LTE), 5G, WiFi, wireless Internet protocol (IP), IEEE 802.11, etc.

In some examples, the Internet 275 can include a number of routing agents and processing agents (not shown in FIG. 2 for the sake of convenience) and can include a global system of interconnected computers and computer networks that uses a standard Internet protocol suite (e.g., the Transmission Control Protocol (TCP) and IP) to communicate among disparate devices/networks discussed herein. In example aspects, remote access to the devices 210-220 may be enabled through the Internet 275 through the use of a gateway 245 and one or more controllers such as the controller 230. In some aspects, the controller 230 can generally observe, monitor, control, or otherwise manage the various other components in the network 200. For example, the controller 230 can communicate with the access point 225 over the heterogeneous access network 208 and/or direct wired connection 209 to interact with the devices 210-220, where such interactions can include monitoring or managing attributes, activities, or other states associated with the various devices 210-220.

A computer 222, such as a desktop or personal computer (PC), is shown as connecting to Internet 275 directly (e.g., over an Ethernet connection or Wi-Fi or 802.11-based network). The computer 222 may alternatively, or additionally, have a wired connection to Internet 275 or the computer 222 may be connected directly to the access point 225. Although illustrated as a desktop computer, the computer 222 may be a laptop computer, a tablet computer, a PDA, a smart phone, or the like. In some examples, the computer 222 can include a cloud computing system or a system of two or more computers acting in coordination. In some examples, the computer 222 may be used to implement one or more sensor fusion management techniques for fusing data obtained from the devices 210-220. In some examples, one or more other devices such as the access point 225, the gateway 245, or other computing device of the network 200 can also be configured to implement one or more sensor fusion management techniques (in addition to or as an alternative to the computer 222 configured in this regard). In some examples, a monitoring system (not separately shown) can also be connected to the computer 222 or to the network 200 through the Internet 275. A server 270 can be optional, and can be implemented as a plurality of structurally separate servers, or alternately may correspond to a single server.

In some examples, the various devices 210-220 can have various functions, among which functions related to data gathering and forwarding will be of particular focus. For example, in the above-described context of the network 200, the mobile device or user equipment (UE) 210 can include a personal tablet, cellular phone, or satellite phone which can be carried by any human actor within the geographical area. The mobile device 210 can gather various types of information such as locational information (e.g., geographical coordinates using a global positioning system or other triangulation/trilateration technique), as well as audio, video, or other multi-media information captured through various input sources to the mobile device 210. The mobile device 210 can be configured to periodically send some or all of the captured information over the air, either on demand or as part of periodic updates or backups to a cloud server. In various examples, the information gathered by the mobile device 210 can be used as one or more data sources.

For example, using an endpoint address or identifier of the mobile device 210, information about a user of the mobile device 210 can be obtained. A database of known mobile device identifiers can be maintained for benign actors such as rangers or staff who have registered their devices with a monitoring system such as the computer 220. The location information for the known mobile devices 210 can be tracked (which can be flexibly enabled through user settings for privacy configurations) to determine the location of at least some benign actors in the geographical area. If signals from transmission/reception of data by mobile devices which are unknown or unregistered in the database are detected, it may be possible to triage such information to determine whether malicious or unwarranted actors are present.

Such detection can be enhanced or alternatively performed through various other means. For instance, various motion/video sensors 212 can be deployed at several strategic locations in the geographical area. The motion/video sensors 212 can include different types of security cameras, infrared motion detectors, or the like, which may be battery powered, solar powered, etc. The motion/video sensors 212 can either capture images or video feeds at various resolutions or generate alerts. Data streams which can be forwarded from the motion/video sensors 212 can include various combinations of the images, video, alerts, at configurable resolutions, frames per second, accuracy, update/refresh rates, etc. It is possible to augment any detection performed by tracking the mobile devices with information supplied by the data streams from the motion/video sensors 212. Alternatively, the data streams from the motion/video sensors 212 can be a primary source of information relied upon to monitor and identify potential threats in the geographical area. The motion/video sensors 212 can sometimes generate false positives (e.g., generate an alert based on detected wind movement or movement of an insect on a camera surface, but such a false positive for motion detection of a human or animal may confuse tracking mechanisms while also consuming transmission bandwidth and power resources of the motion/video sensors 212 and network 200).

In some examples, microphones or audio sensors 214 may also be disposed to augment the data stream from the motion/video sensors 212 or to serve as an independent means of information used in the above context. Similar to the motion/video sensors 212, the audio sensors 214 can also collect and supply data streams which can include configurable levels of transmission power, detection types and noise thresholds, channels utilized for transmission, bit rate, resolution, etc. The audio sensors 214 can also suffer from limited power supply which may need to be recharged periodically.

One or more radars 216 can be used for object detection using radio waves. Radar technology has evolved to the point where it may be possible to detect objects at near or far range through the use of transmitting radio waves and studying their reflection from the objects. However, radars 216 may be unable to disambiguate among a close cluster of objects such as a group of animals or humans in tight formations.

In some examples, in addition to or in lieu of one or more of the above devices, one or more drones 218 may be deployed in the geographical area. The drones 218 can include any partially or fully autonomous vehicles or aircraft which can move on land, water, or air and carry monitoring equipment. Among other information, the drones 218 can collect audio data, video data, coordinates, etc. The one or more drones 218 may not be fixed in any location but can be flexibly deployed when data from one or more of the other devices in network 200 may be determined to be insufficient and/or inaccurate for any particular purpose.

Also shown in FIG. 2 are one or more thermal sensors 220. The thermal sensors 220 can be equipped to obtain thermal images, thermal signatures, and so on. The 220 thermal sensors may be capable of detecting body heat emitted from animals and/or humans. The thermal sensors 220 can be used to detect or augment detection of one or more objects in the field.

Accordingly, there can be various types of data obtained from the different devices 210-220, or others at any given time in network 200. There can be many objectives, among which identifying poachers has been mentioned as one of the objectives. Considering this in the context of wildlife preservation, it is possible to describe the example sensor fusion management system with some illustrative examples as follows.

Figure 3:
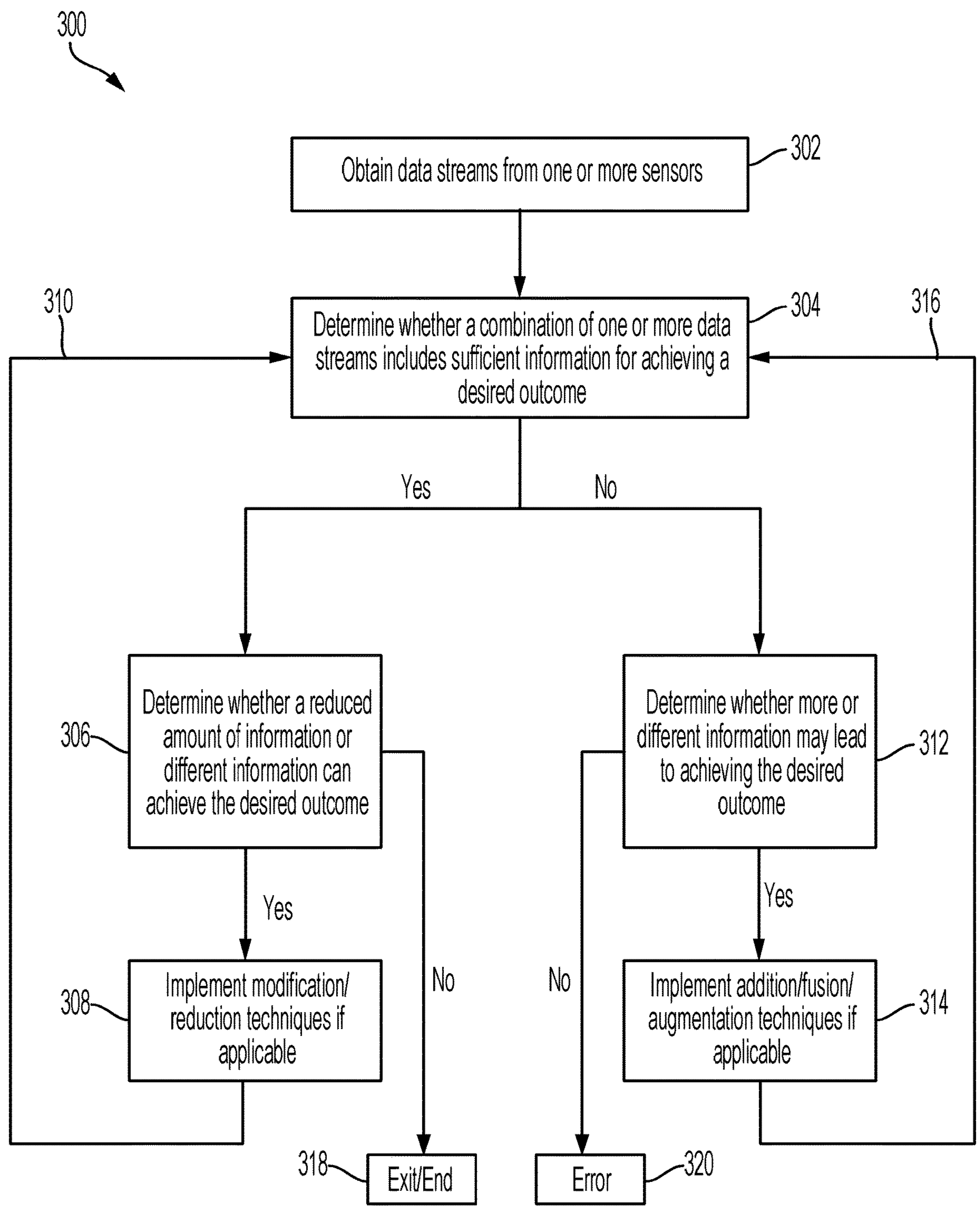
FIG. 3 illustrates a process for cognitive sensor fusion management, in accordance with some examples.

FIG. 3 illustrates a process 300 corresponding to an example cognitive algorithm which can be implemented by the sensor fusion management system according to this disclosure. To provide context to the process 300 an example is considered with combined reference to FIG. 2, where one or more devices 210-220 may be strategically placed at pre-determined locations or may be flexibly deployed in a geographical area monitored using the network 200.

At step 302, the process 300 can include obtaining one or more data streams by a monitoring system, e.g., at computer 222. An objective of process 300, which can be dynamically updated, can include detection of animals and/or humans within a restricted area. If there is such a detection, the system can be updated to determine whether there are any potential threats, for example. Accordingly in some examples, data streams from one or more devices 210-220 can be automatically discovered and on-boarded. In an example, the process 300 can start by considering data from the thermal sensors 220. Ground truths may be established with respect to heat signatures or thresholds that can correspond to warm blooded creatures. The one or more thermal sensors 220 can collect data including thermal images in their vicinity and either constantly provide the data to the access point 225 or provide updates which can be periodic or event-based, e.g., upon detection of any potentially warm blooded creature.

At step 304, the process 300 determining whether the data provided by the one or more thermal sensors 220 may be sufficient to determine whether there are deviations of concern which must be addressed (e.g., a human or animal has entered the restricted zone).

If at step 304 it is determined that there is sufficient information, then in step 306, the process 300 includes determining whether there is too much information, and analyzing whether less information may also suffice to reach the same conclusion. For example, at step 306, the process 300 can include determining that the information can be obtained from less thermal sensors 220 that were used at step 304 or using less updates from the same number of thermal sensors 220 that were used at step 304. Alternatively, it may be determined that thermal sensors 220 may be too expensive and/or inaccurate for the desired outcome and a decision can be made to switch to a cheaper and/or more accurate sensor which can save costs and achieve the same or even better outcome. For example, it may be determined that the use of a motion/video sensor 212 and/or a radar 216 in place of one or more thermal sensors 220 can achieve the same or better outcome, possibly at a lower cost, power savings, lower bandwidth, etc.

At step 306 if it is determined that "No," a reduced amount of information or different information would not achieve the desired outcome, then the process 300 proceeds to the step 318, where the process 300 may end or be exited from. For example, following the step 318 for an exit/end to the process 300, the process 300 can return to the step 302 to gather data streams for subsequent iterations of the cognitive sensor fusion algorithm or use any existing sensor fusion data to achieve the outcomes possible with the existing sensor fusion data. Otherwise, at step 306 if it is determined that "Yes," a reduced amount of information or different information can achieve the desired outcome, then the process 300 proceeds to the step 308.

At step 308, the process 300 can include implementing one or more reduction and/or modification techniques as applicable based on the determination at step 306. For example, if one or more thermal sensors 220 can be powered off or not used then such a reduction may be effected. If a modification using a different type of sensor and/or different type of data can be beneficial then a corresponding process may be implemented. In various examples, the steps 306-308 can be implemented in stages, potentially with a feedback to determine whether a change implemented in the step 308 has achieved its expected outcome as projected in the step 306.

In some examples, the process 300 can also include a feedback path 310 to the step 304 to determine whether the desired outcome has been achieved after any changes implemented in the step 308. A closed-loop implementation with the feedback path 310 can potentially lead to improvements in updating the desired outcome. For example, if the desired outcome of detecting humans and/or animals within the restricted area has been achieved, then a modified outcome may be pursued, potentially to detect what type of human or animal it may be, how many such potential intruders may exist, etc. With the desired outcome having been redefined, the process 300 can be repeated. In this manner a continuous learning and evolving process can be implemented in the cognitive sensor fusion management according to aspects of this disclosure.

Returning to the analysis at step 304, if it is determined that there is not sufficient information, then in step 312, the process 300 includes determining whether there more information or different information can lead to achieving the desired outcome. For example, at step 312, the process 300 can include determining that the desired information can be obtained from more thermal sensors 220 that were used at step 304 or using more updates from the same number of thermal sensors 220 that were used at step 304. Alternatively, it may be determined that thermal sensors 220 may be too expensive and/or inaccurate for the desired outcome and a decision can be made to switch to a more accurate sensor which can achieve the desired outcome (or even an improvement thereof). For example, it may be determined that the use of a motion/video sensor 212 and/or a radar 216 in place of one or more thermal sensors 220 can achieve the desired outcome. It may also be possible to deploy a drone 218 to obtain footage of the restricted area to determine whether there may have been intruders. In some examples, if a mobile device 210 belonging to a ranger is detected in close proximity to the restricted area, a notification may be issued to the ranger through the mobile device 210 to go inspect a possible intrusion and report any findings back to the monitoring system.

At step 312 if it is determined that "No," more or different information may not lead to achieving the desired outcome, then the process 300 may go to step 320 where an error condition is flagged. For example, if the desired outcome is not possible to be achieved using the obtained data streams from the one or more sensors, then the process 300 may not be successful in providing a cognitive sensor fusion technique to achieve the desired outcome. The process 300 can be repeated with different data streams or may proceed with the level of outcome possible with the existing data streams. Any other subsequent steps may be implemented following step 320, consistent with particular implementations. Otherwise, at step 312 if it is determined that "Yes," more or different information may lead to achieving the desired outcome, then the process 300 proceeds to the step 314.

At step 314, the process 300 can include implementing one or more addition/fusion/augmentation techniques as applicable based on the determination at step 312. For example, one or more additional thermal sensors 220 can be powered on or used, and/or one or more different types of sensors can be deployed, etc., as discussed above. In various examples, the steps 312-314 can be implemented in stages, potentially with a feedback to determine whether a change implemented in the step 312 has achieved its expected outcome as projected in the step 314.

In some examples, the process 300 can also include a feedback path 316 to the step 304 to determine whether the desired outcome has been achieved after any changes implemented in the step 314. A closed-loop implementation with the feedback path 316 can potentially lead to improvements in updating the desired outcome and foster continuous learning and evolving process as previously noted.

In some examples, the changes made in the steps 306-308 and/or 312-314 can also be based on other criteria. For example, if some thermal sensors 220 currently being used may be battery driven (e.g., solar powered) but may be running out of battery, then based on other context, such as availability of other sensors, changes can be made similar to those described in these steps, potentially independent of whether the information in step 304 was determined to be sufficient or not. This invention pertains to methods for dynamically adapting the selection of inputs based on various criteria. For instance, in some cases, the cognitive sensor fusion management system can balance between accuracy and sustained operation based on the remaining power at a battery powered sensor. The cognitive sensor fusion management system can selectively reduce the source input streams and/or devices automatically, and even trigger actions to reduce the sensor update rates, shut down or send to sleep mode those that are not strictly needed (helps to prolong battery life of sensors). In some examples, as previously mentioned, one or more other devices such as the gateway 245, the access point 225, or other computing device can also be managed with power conservation objectives by the cognitive sensor fusion management system. For example, one or more of such access points, gateways, or other computing devices can be battery powered or benefit from power conservation, and accordingly, the power available to such devices can be provided as another input to the cognitive sensor fusion management system (e.g., in examples where such computing devices can be configured to manage, transmit, or channel the data streams). In some examples, reducing the number of inputs to the gateways or access points can also help with power conservation. For example, in the process flow including the steps 306, 308, and 310, a reduced amount of information processed or handled by the compute devices can lead to battery conservation while continuing to provide the information for the desired outcome. Such reductions can include reducing one or more local processes, such as data filtering, embedded video analysis, local sensor fusion, or others being implemented on one or more of the devices of the network 200.

In some examples, the sensors can be utilized to achieve an objective such as balancing power conservation and accuracy by analyzing data from a plurality of sensor streams and learning in a closed loop system whether the system has access to more data, less, or the specific amount of data needed to obtain a specific task (e.g., tracking objects on a field with a predetermined level of acceptable accuracy). In some examples, when a sensor picks up data that needs to be confirmed or enhanced by other sensors, the cognitive model can intelligently power the minimum number of sensors to achieve the desired outcome. For example, in some cases, some sensors can be powered on or deployed in a sequence, which can enable intelligently adding or modifying data from other sensors in a stepwise approach.

Figure 4:
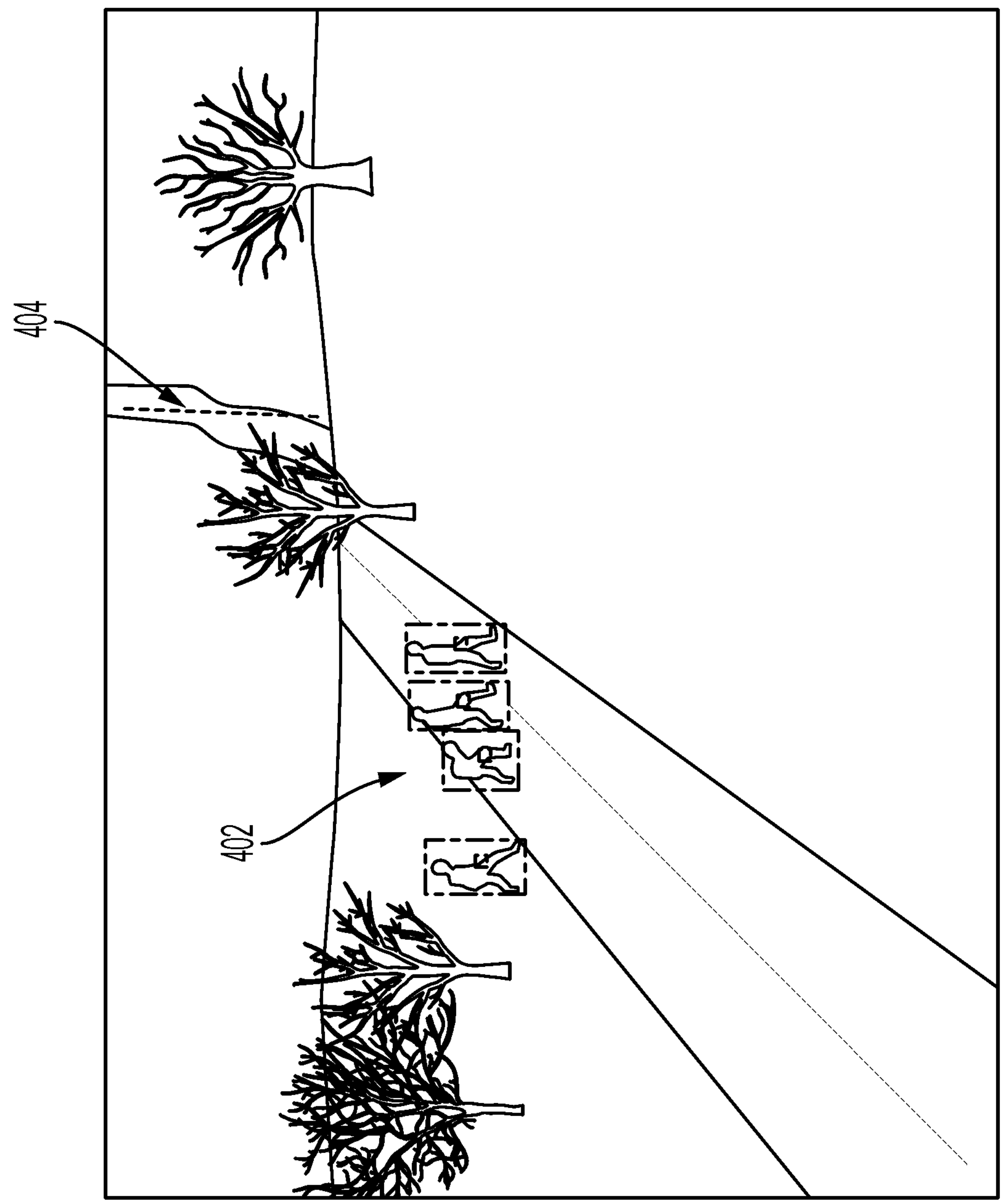
FIG. 4 illustrates an example implementation of cognitive sensor fusion management techniques, in accordance with some examples.

FIG. 4 illustrates another example implementation of the cognitive sensor fusion management system. A video feed 400 from a motion/video sensor 212 is shown. The video feed 400 can provide video data to the monitoring system, where in one instance, several blobs 402 can be created for tracking objects detected by analyzing the video feed 400. Boundary lines 404 may have been recognized or programmed, to trigger alerts if objects traverse such boundary lines. In this instance, when one or more of the blobs 402 have been detected as crossing the boundary lines a desired outcome can involve identifying whether the blobs belong to malicious actors or potential threats. However, disambiguation of the blobs 402 or further identification may not be possible based on the quality of the video feed 400. Thus, considering the process 300, it may be determined at the step 304 that there is not sufficient information, which may trigger the steps 312-314, for example, to augment the video feed 400. In some examples, video feeds from other motion/video sensors 212 at a different vantage point and/or inputs from audio sensors 214 or other devices 210-220 can be used to disambiguate the blobs 302 and help with further identification.

It will be understood that the above examples are merely to illustrate the type of context-driven cognitive algorithms which can be used in sensor fusion and may not correspond to any specific technical solutions for particular outcomes. For example, various other types of sensors or tracking mechanisms can be implemented for the above illustrative examples, without deviating from the scope of this disclosure.

Figure 5:
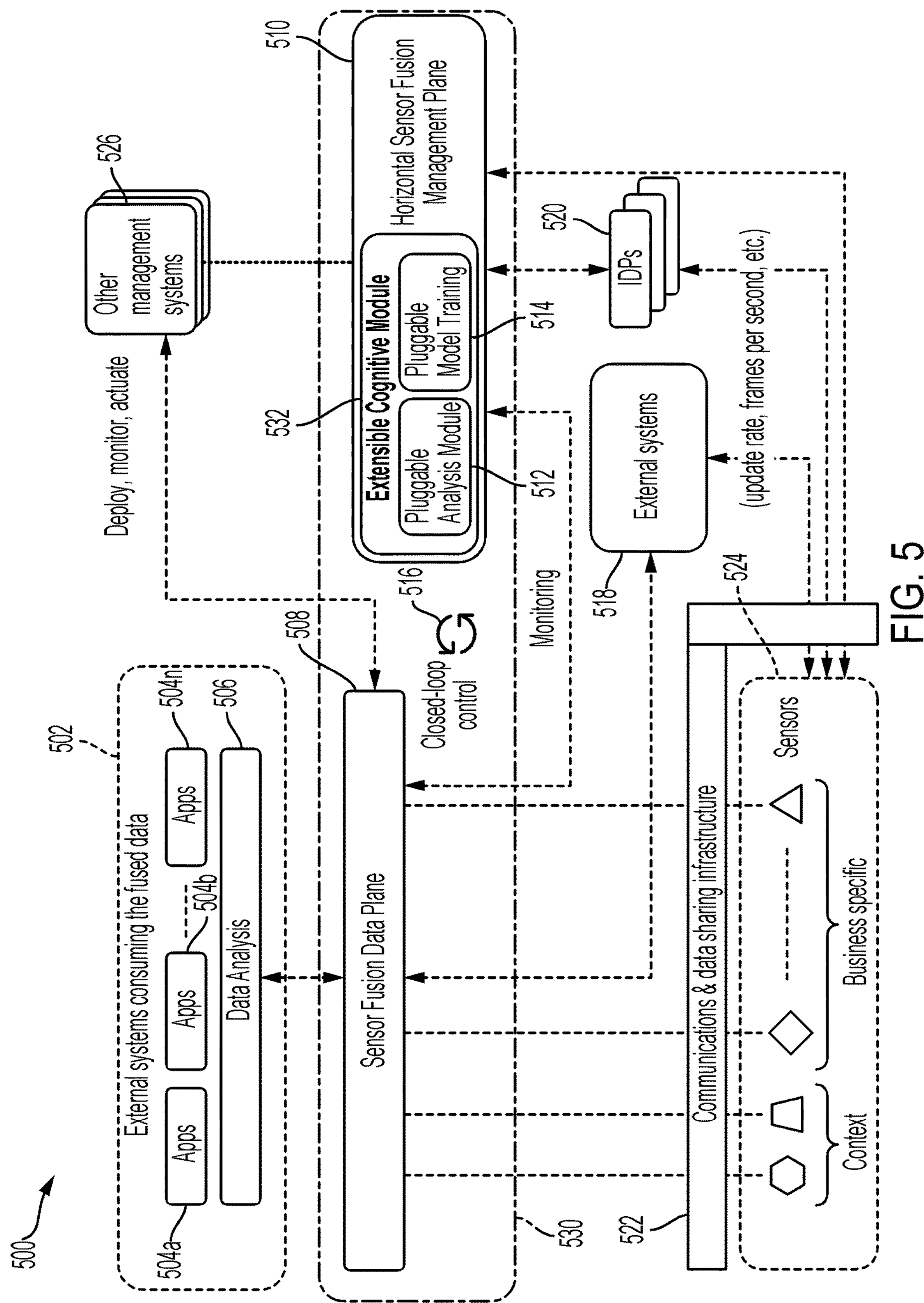
FIG. 5 illustrates a cognitive sensor fusion management system, in accordance with some examples.

FIG. 5 illustrates a schematic view of a cognitive sensor fusion management system 500. The system 500 can be configured to implement the various above-described functions and processes. The system 500 will also be described with the aid of illustrative examples, but it will be appreciated that the scope of the system 500 is not limited to any particular implementation or business vertical but may be adapted for cognitive sensor fusion management in any environment.

In further detail, one or more sensors 524 may be available for collecting and supplying sensor data for the system 500. The sensors 524 can include any type of sensor such as the devices 210-220 or others. In some examples, the sensors 524 can include context-based sensors whose functionalities and configurations may be based on a particular context. For example, there may be several options available for a given context, such as monitoring a gaming reserve, and one or more sensors (such as the devices 210-220) can be flexibly utilized based on dynamically varying situations and requirements within that context. In some examples, the sensors 524 can include business specific sensors. For example, the endpoints 130 shown in the network 100 of FIG. 1 can include sensors which may be utilized for collecting information about an enterprise. The business specific sensors can also configured and flexibly utilized to adapt to changing needs and requirements of the business.

A communications and data sharing infrastructure 522 can manage communications and data flow to and from the sensors 524. For instance, the infrastructure 522 can include one or more control and/or data buses to provide commands, control signals, protocol settings, configurations, etc., as well as carry data between the sensors 524 and the other functional blocks of the system 522. In some examples, the infrastructure 522 can have adjustable bandwidth, selectable channels, configurable transmit and receive power settings, etc., to fine tune the utilization of resources of the infrastructure 522. In some examples, the infrastructure 522 can support any suitable combination of wired and wireless interconnections and include interfaces for such interconnections. In some examples, the infrastructure 522 can include support for high bandwidth data streaming for use in multi-media, gaming, cloud computing, and other applications.

In some examples, one or more external systems 518 can interact with the system 500. For example, the external systems 518 can be controlled by outside vendors for providing specific services which support sensor data and handling. For example, vendors or service providers and original equipment manufacturers (OEMs) for the sensors can provide subsystems which can control and handle different types of data which may be obtained from the sensors 524 and format them for universal handling. For example, data streams obtained from the various sensors 524 can include different update rates, frames per second, transmission powers, etc., which can be processed by the external systems 518 and converted to formats which can be acted upon in a seamless manner by the learning algorithms employed by system 500.

In some examples, various data streams from the different sensors 524 can be channeled through common media (e.g., supported by the infrastructure 522). It may be important to identify the source of specific data streams. One or more identity providers (IDPs) 520 may be used for identifying the source of a data stream and associating identifiers with the data streams. This way, the cognitive fusion algorithms can selectively choose from the different data streams guided by knowledge of the sources for the different data streams.

One or more of the IDPs 520, the external systems 518, the infrastructure 522, the sensors 524, or suitable combinations thereof can be operated for providing the data streams from one or more sensors as discussed with reference to block 302 of FIG. 3 above. A management system 530 can be provided in the system 500 for performing one or more steps of the process 300 for the cognitive sensor fusion management, as described in greater detail below.

The management system can include a sensor fusion data plane 508 and a horizontal sensor fusion management plane 510. The sensor fusion data plane 508 can receive the one or more data streams from the sensors 524 and fuse them using guidance from the horizontal sensor fusion management plane 510 for generating one or more desired outcomes. For example, the sensor fusion data plane 508 can be configured to obtain the information provided by the various devices 210-220, receive specific and dynamic guidance from the steps 308, 314, for example on which specific streams of sensor data are to be combined, and implement this guidance for achieving outcomes in the context of monitoring a geographical area, such as detecting potential threats, generating alerts, etc.

The horizontal sensor fusion management plane 510 can obtain the data from the external systems 518 and the IDPs 520 and implement the step 304 for dynamically determining the nature of currently available sensor fusion data and making decisions on potential changes modifications, e.g., the steps 306 and 308.

A closed loop control 516 can include the feedback paths 310, 316 between the steps 308, 314 implemented by the sensor fusion data plane 508 and the steps 304, 306, 312 implemented by the horizontal sensor fusion management plane 510.

In some examples, the horizontal sensor fusion management plane 510 can be adapted to different contexts and/or business verticals. For example, the horizontal sensor fusion management plane 510 can be agnostic of the context or business vertical, but can learn and evolve by learning from numerous iterations of the process 300. In some examples, the horizontal sensor fusion management plane 510 can be dynamically updated or extended using an extensive cognitive module 532. The extensive cognitive module 532 can include a pluggable analysis module 512 and a pluggable model training module 514. The pluggable analysis module 512 can include any suitable artificial intelligence or learning model which can be particularly suitable for a chosen business vertical or context, and may be added as an extension to the existing learning systems implemented by the horizontal sensor fusion management plane 510. Similarly, the pluggable model training module 514 can include various training data, ground truths, etc., which may have been predetermined for specific business verticals or contexts. The use of various modules available through the extensive cognitive module 532 can be optional and may be adopted where savings are recognized in terms of training speed and/or model accuracy.

In addition to the cognitive sensor fusion management discussed above, there may be other systems which interface with the system 500 for consuming the fused data. For example, one or more external systems 502 can include various applications 504*a*-*n* which may utilize the fused data. For example, the monitoring mechanisms discussed above can supply the outcomes of the sensor fusion (e.g., any alerts generated or detected threats) to law enforcement or other protection systems which can utilize the outcomes and take suitable corrective measures. A data analysis plane 506 can be provided to cater to one or more of the applications 504*a*-*n* which belong to the external systems 502. The data analysis plane 506 can obtain the fused data from the sensor fusion data analytics plane 508 and perform any further analytics. For instance, the data analytics plane 508 can include additional learning models which can analyze the outcomes generated in the monitoring context discussed above to discern any additional details or patterns which may be useful for the applications 504*a*-*n*.

Further, the system 500 can also include or interface with other management systems 526 which can perform functions related to the sensors such as deploying, monitoring, actuating, etc. For example, if the outcome of the sensor fusion data plane indicates an alert as discussed above, the management systems 526 can be configured to deploy additional sensors or trigger notifications to personnel in response. In some examples, the management systems 526 can actuate any electromechanical systems (e.g., move a camera angle or lens focus/position of a motion/video sensor 212 in response to determining that a particular data stream from the motion/video sensor 212 may not be sufficient but a change in the camera angle or lens focus/position can improve the outcome).

Figure 6:
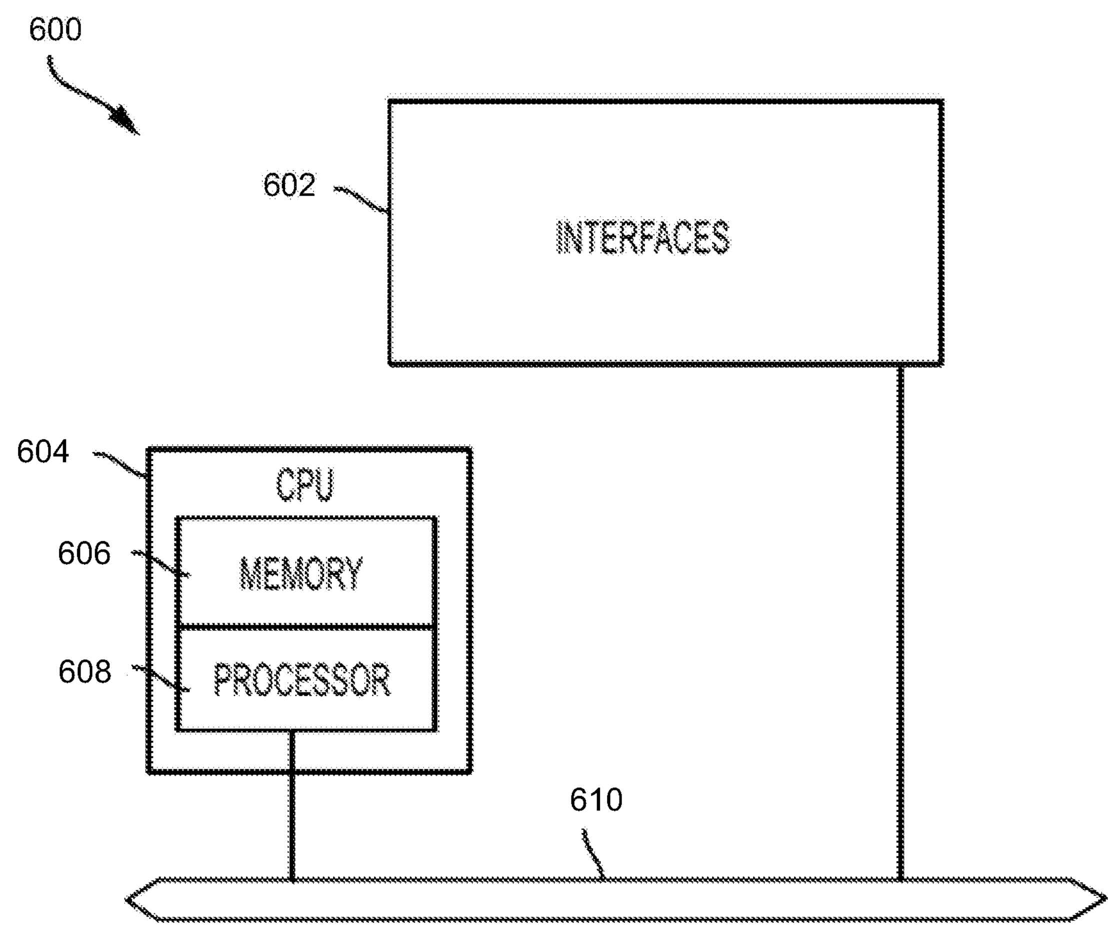
FIG. 6 illustrates an example network device in accordance with some examples.

FIG. 6 illustrates an example network device 600 suitable for implementing the aspects according to this disclosure. In some examples, the one or more devices 210-220 and/or any of the sensors 524 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, serial interfaces, wireless interfaces such as Bluetooth, Bluetooth Low Energy (BLE), Near Field Communication (NFC), and the like. In addition, various very high-speed interfaces may be provided such as fast token ring interfaces, wireless interfaces, Ethernet interfaces, Gigabit Ethernet interfaces, ATM interfaces, HS SI interfaces, POS interfaces, FDDI interfaces, WIFI interfaces, 3G, 4G, LTE, BLTE, PLTE, 5G, or other cellular interfaces, CAN BUS, LoRa, heterogeneous network, or any access network. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. bis one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
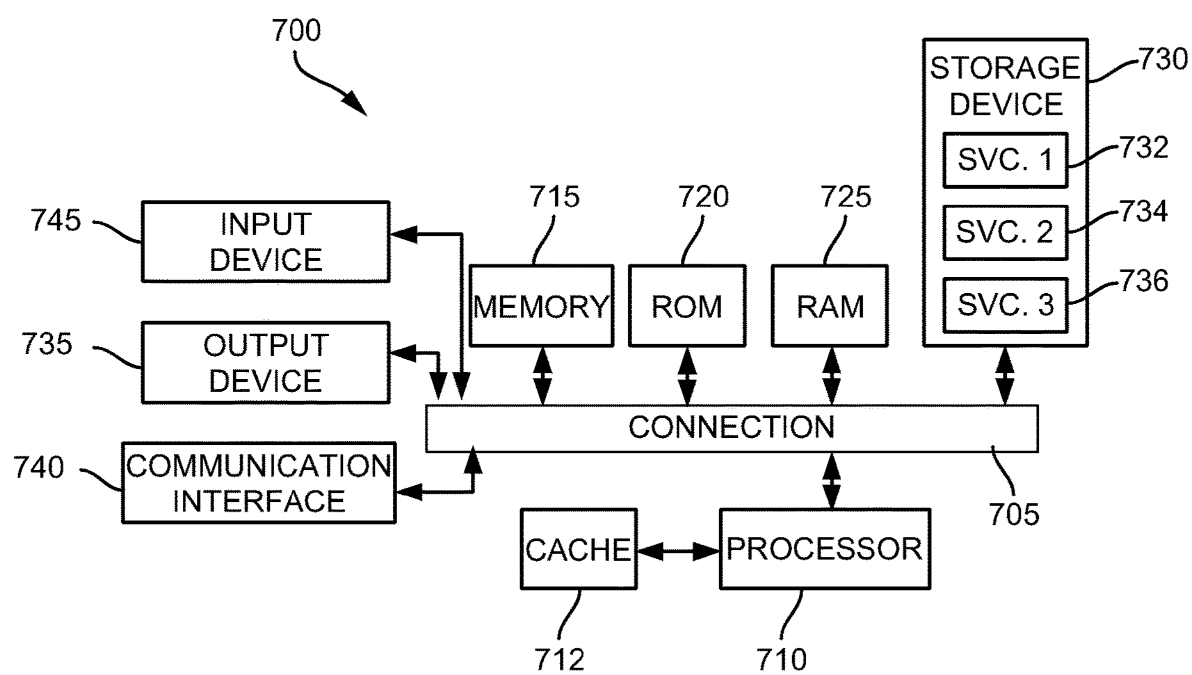
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting “at least one of” a set indicates that one member of the set or multiple members of the set satisfy the claim. For example, claim language reciting “at least one of A and B” means A, B, or A and B.

What is claimed is:

1. A method comprising:

obtaining one or more data streams from one or more sensors in a cognitive sensor fusion management system;

automatically identifying a type of data and related data sources for a sensor fusion management model of the cognitive sensor fusion management system;

selecting a subset of data streams from the one or more data streams based on the identified type of data and related data sources for the sensor fusion management model, wherein the subset of data streams are obtained from sensors having different types and capability, and wherein the selecting is further based on evaluating a respective capability of a sensor associated with each respective data stream of the subset of data streams;

determining whether a combination of the subset of data streams comprises sufficient information for achieving a desired level of accuracy associated with implementing the sensor fusion management model using the combination of the subset of data streams, the determining based on using a machine learning network to analyze the combination of the subset of data streams and the desired level of accuracy against a power consumption at each respective sensor of a subset of sensors included in the one or more sensors; and determining one or more modifications to at least the subset of data streams or one or more sensors based on whether the combination of the subset of data streams comprises sufficient information for achieving the desired level of accuracy.

2. The method of claim 1, wherein the one or more modifications comprise a reduction in at least the one or more data streams or the one or more sensors.

3. The method of claim 2, further comprising implementing the reduction and determining whether a combination of one or more data streams obtained from implementing the reduction comprises sufficient information for achieving the desired level of accuracy.

4. The method of claim 1, wherein the one or more modifications comprise an increase in at least the one or more data streams or the one or more sensors.

5. The method of claim 4, further comprising implementing the increase and determining whether a combination of one or more data streams obtained from implementing the increase comprises sufficient information for achieving the desired level of accuracy.

6. The method of claim 1, further comprising updating the desired level of accuracy based on implementing one or more of the modifications.

7. The method of claim 1, further comprising implementing the one or more modifications to improve accuracy of the desired level of accuracy or reduce power consumption of the one or more sensors, one or more gateways, one or more access points, or other computing devices.

8. The method of claim 1, wherein obtaining the one or more data streams comprises one or more of automatic discovery, onboarding, managing identities, implementing policy controls, or applying sensor fusion algorithms on sensor data obtained from the one or more sensors.

9. The method of claim 1, wherein the desired level of accuracy is dynamically determined by the cognitive sensor fusion management system based on one or more of a context or business vertical.

10. The method of claim 1, wherein the one or more sensors comprise one or more of audio, video, motion detection, radar, or thermal imaging sensors.

11. A system, comprising:

one or more processors; and a non-transitory computer-readable storage medium containing instructions which, when executed on the one or more processors, cause the one or more processors to perform operations including:

obtaining one or more data streams from one or more sensors in a cognitive sensor fusion management system;

automatically identifying a type of data and related data sources for a sensor fusion management model of the cognitive sensor fusion management system;

selecting a subset of data streams from the one or more data streams based on the identified type of data and related data sources for the sensor fusion management model, wherein the subset of data streams are obtained from sensors having different types and capability, and wherein the selecting is further based on evaluating a respective capability of a sensor associated with each respective data stream of the subset of data streams;

determining whether a combination of the subset of data streams comprises sufficient information for achieving a desired level of accuracy associated with implementing the sensor fusion management model using the combination of the subset of data streams, the determining based on using a machine learning network to analyze the combination of the subset of data streams and the desired level of accuracy against a power consumption at each respective sensor of a subset of sensors included in the one or more sensors; and determining one or more modifications to at least the subset of data streams or one or more sensors based on whether the combination of the subset of data streams comprises sufficient information for achieving the desired level of accuracy.

12. The system of claim 11, wherein the one or more modifications comprise a reduction in at least the one or more data streams or the one or more sensors.

13. The system of claim 12, wherein the operations further comprise implementing the reduction and determining whether a combination of one or more data streams obtained from implementing the reduction comprises sufficient information for achieving the desired level of accuracy.

14. The system of claim 11, wherein the one or more modifications comprise an increase in at least the one or more data streams or the one or more sensors.

15. The system of claim 14, wherein the operations further comprise implementing the increase and determining whether a combination of one or more data streams obtained from implementing the increase comprises sufficient information for achieving the desired level of accuracy.

16. The system of claim 11, wherein the operations further comprise updating the desired level of accuracy based on implementing one or more of the modifications.

17. The system of claim 11, wherein the operations further comprise implementing the one or more modifications to improve accuracy of the desired level of accuracy or reduce power consumption of the one or more sensors, one or more gateways, one or more access points, or other computing devices.

18. The system of claim 11, wherein obtaining the one or more data streams comprises one or more of automatic discovery, onboarding, managing identities, implementing policy controls, or applying sensor fusion algorithms on sensor data obtained from the one or more sensors.

19. The system of claim 11, wherein the desired level of accuracy is dynamically determined by the cognitive sensor fusion management system based on one or more of a context or business vertical.

20. A non-transitory machine-readable storage medium, including instructions configured to cause a data processing apparatus to perform operations including:

obtaining one or more data streams from one or more sensors in a cognitive sensor fusion management system;

automatically identifying a type of data and related data sources for a sensor fusion management model of the cognitive sensor fusion management system;

selecting a subset of data streams from the one or more data streams based on the identified type of data and related data sources for the sensor fusion management model, wherein the subset of data streams are obtained from sensors having different types and capability, and wherein the selecting is further based on evaluating a respective capability of a sensor associated with each respective data stream of the subset of data streams;

determining whether a combination of the subset of data streams comprises sufficient information for achieving a desired level of accuracy associated with implementing the sensor fusion management model using the combination of the subset of data streams, the determining based on using a machine learning network to analyze the combination of the subset of data streams and the desired level of accuracy against a power consumption at each respective sensor of a subset of sensors included in the one or more sensors; and determining one or more modifications to at least the subset of data streams or one or more sensors based on whether the combination of the subset of data streams comprises sufficient information for achieving the desired level of accuracy.

* * * * *